(12) United States Patent
Kusche et al.

(10) Patent No.: US 6,652,334 B1
(45) Date of Patent: Nov. 25, 2003

(54) FLYWHEEL STRUCTURE WITH AN INTERNALLY MOUNTED TORSIONAL DAMPER

(75) Inventors: David W. Kusche, Oshkosh, WI (US); James C. Hubbell, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 10/197,984

(22) Filed: Jul. 18, 2002

(51) Int. Cl.[7] .................................................. B63H 1/15
(52) U.S. Cl. ............................................................ 440/52
(58) Field of Search ............................................. 440/52

(56) References Cited

U.S. PATENT DOCUMENTS

| | | | |
|---|---|---|---|
| 4,325,350 A | 4/1982 | Bauer et al. ................ 123/605 |
| 4,617,884 A | * 10/1986 | Allen et al. ............... 123/192.1 |
| 4,796,740 A | 1/1989 | Fukushima .................. 192/30 |
| 4,914,949 A | 4/1990 | Andra et al. .................. 74/574 |
| 5,065,642 A | 11/1991 | Kagiyama et al. ............ 74/574 |
| 5,074,812 A | * 12/1991 | Watanabe .................... 440/52 |
| 5,762,557 A | 6/1998 | Chazot et al. ................ 464/62 |
| 5,873,445 A | 2/1999 | Haberbusch et al. ........ 192/280 |
| 5,984,057 A | 11/1999 | Nash .......................... 188/290 |
| 6,024,615 A | 2/2000 | Eichinger .................... 440/52 |
| 6,032,773 A | * 3/2000 | Fukushima ............... 192/30 V |
| 6,283,080 B1 | 9/2001 | Tsunoda et al. ............ 123/192 |

OTHER PUBLICATIONS

U.S. patent application Ser. No. 09/726,567, Morikami, filed Jun. 7, 2001.

* cited by examiner

*Primary Examiner*—Jesus D. Sotelo
(74) *Attorney, Agent, or Firm*—William D. Lanyi

(57) ABSTRACT

A torsional damper is provided for an outboard motor and disposed between a flywheel and the engine of the outboard motor. The torsional damper is also shaped to be disposed within a cavity of the flywheel formed by a plate portion and a skirt portion of the flywheel. The torsional damper comprises an inner member that is attached to the flywheel, an outer wheel that operates as a spring mass, and a resilient central member that is made of an elastomeric material and disposed between the inner and outer members.

14 Claims, 3 Drawing Sheets

FLYWHEEL STRUCTURE WITH AN INTERNALLY MOUNTED TORSIONAL DAMPER

BACKGROUND OF THE INVENTION

1. Field of the Invention

The present invention is generally related to a flywheel and damper assembly and, more particularly, to a flywheel that is provided with a damper that is attached to the flywheel at a position that is contained by the flywheel structure and located between the flywheel and an internal combustion engine.

2. Description of the Prior Art

Many different types of machines are provided with flywheels. It is common for an internal combustion engine to have a flywheel attached to its crankshaft. When the internal combustion engine is used in conjunction with an is outboard motor, in which the crankshaft is mounted for rotation about a vertical axis, a flywheel can be attached to the crankshaft either above or below the structure of the engine block. Many different types of damping mechanisms are well known to those skilled in the art. These damping structures are provided to decrease torsional vibration that could otherwise be present during operation of the engine.

U.S. Pat. No. 4,796,740, which issued to Fukushima on Jan. 10, 1989, describes a flywheel assembly that has an outer peripheral part of a first flywheel engaged with or disengaged from a clutch disc connected to a crankshaft by a relatively thin connecting plate disposed along an end face of a second flywheel opposite to the clutch disc. It further comprises an outer periphery supporting mechanism which supports a damper inertial part of the second flywheel relative to the first flywheel in a circumferentially rockable manner, a torsion damper mechanism which resiliently connects the damper inertia part to a friction damping mechanism. This component is installed in an inner peripheral part of the damper inertial part of the second flywheel.

U.S. Pat. No. 5,873,445, which issued to Haberbusch et al on Feb. 23, 1999, describes a method of manufacturing a damping flywheel, for motor vehicles. The apparatus and method of manufacturing a damping flywheel has two coaxial masses, one of which is designed to be rotational integral with a driveshaft such as the crankshaft of an internal combustion engine while the other coaxial mass is designed to be connected with a driven shaft such as the input shaft of a gear box. The first mass includes a chamber which may be at least partially filled with a pasty or viscous agent and houses a circumferentially acting resilient member disposed between the two coaxial masses. The agent is deposited at the outer periphery of the first mass before the chamber is closed.

U.S. Pat. No. 5,762,557, which issued to Chazot et al on Jun. 9, 1998, describes a damped flywheel having a resilient member disposed between two coaxial masses. The flywheel has two coaxial masses which are mounted for movement with respect to one another against the action of a resilient damping device including at least one resilient member mounted for articulation on both sides of the coaxial masses. The resilient member acts generally in a radial direction between the coaxial masses in a rest position of the flywheel to occupy a stable rest position. A second coaxial mass is mounted for rotation on the first coaxial mass through bearing members which are arranged at either the outer or inner peripheries of the first mass.

U.S. Pat. No. 4,914,949, which issued to Andra et al on Apr. 10, 1990, describes a torsional vibration damper. The damper has a hub ring and a flyring which are interconnected through vulcanized-in basic resilient elements as well as resilient units made of rubber that are uniformly distributed around the circumference. These consist of columnar first and second resilient elements which at their outer surfaces merge into one another and at their inner surfaces are spaced from one another. The second resilient elements are precompressed by the first resilient elements and, when the torsional vibration damper is not rotating, are spaced at their outer surfaces from the inner surface of the flyring. At a desired speed of rotation, they are caused by centrifugal force to bear immovably on the inner surface of the flyring. This mechanical connection places their spring action in parallel with the spring action of the basic resilient elements.

U.S. patent application Ser. No. 09/726,567, which was filed by Morikami on Jun. 7, 2001, describes a flywheel structure of an outboard motor. The outboard motor has an engine in which the crankshaft is disposed perpendicularly and a flywheel is disposed to an upper end portion of the crankshaft to be rotatable in unison with the crankshaft and the flywheel is provided with a detecting member, a motion of which is detected by a sensor means for detecting a detecting number of revolutions and a revolution angle of the crankshaft. The detecting member is disposed in an axial direction of the crankshaft.

U.S. Pat. No. 6,024,615, which issued to Eichinger on Feb. 15, 2000, discloses a vibration absorbing apparatus for a rotating system. The dampening system incorporates an inertial mass that is disposed within a hollow portion of an impeller structure. The inertial mass is attached to one or more elastomeric members which are, in turn, attached to an inside surface of a tubular portion of the impeller structure. The angular inertial mass and its elastomeric legs are particularly designed to dampen and counteract a particular frequency at which the propulsion system vibrates when the internal combustion engine is operated at idle speed.

U.S. Pat. No. 6,283,080, which issued to Tsunoda et al on Sep. 4, 2001, describes a vertical internal combustion engine. The engine is intended for use with an outboard motor having a crankshaft directed substantially in a vertical direction with a flywheel provided integrally on a lower end of the crankshaft and an oil pan provided under the flywheel. A lubricating oil pump driven by the crankshaft to rotate is disposed under the flywheel and in the internal combustion engine the center of gravity is positioned low so that the flywheel can be supported stably and the dischargeability of the lubricating oil pump will be high. Moreover, a pair of balancer shafts connected to the crankshaft to be driven thereby is disposed in parallel with the crankshaft on both sides of the engine cylinders and balancer shaft lubricating oil passages are provided for lubricating balancer shaft pivot portions.

U.S. Pat. No. 4,325,350, which issued to Bauer et al on Apr. 20, 1982, describes a alternator powered breakerless capacitor discharge ignition system having improved low speed timing characteristics. The capacitor discharge ignition system provides improved timing characteristics at low, as well as high engine speeds and prevents reverse engine rotation. The alternator rotor and stator assemblies define a first magnetic circuit which provides constant polarity and constant power pulses for charging a single capacitor in the system. The alternator rotor and trigger assemblies define a second magnetic circuit which provides a synchronized narrow trigger pulses, with successive ones being of opposite polarity, to operate an electronic control circuit to effect timed capacitor discharge to a pair of spark plug ignition coils in the system.

U.S. Pat. No. 5,984,057, which issued to Nash on Nov. 16, 1999, describes a rotary damper. The rotary damper has an inner member located within an outer member and an annular seal between the members enclosing a fluid-filled space bounded in part by mutually adjacent faces of the members. A viscous damping force is thereby generated by relative rotation of the members. The seal has a radially inner rim in sliding engagement with the inner member. A resilient flexible retainer held by the outer member bears on the inner seal rim, flexure of the retainer providing a predetermined axial sealing pressure on the rim. The seal includes a diaphragm portion exposed to atmospheric pressure and deformable to accommodate thermal expansion of the fluid in the sealed space.

U.S. Pat. No. 5,065,642, which issued to Kagiyama et al on Nov. 19, 1991, describes an apparatus for absorbing torque variation. The apparatus comprises inertial bodies comprising first and second flywheels, and a. damper mechanism, torque limiting mechanism and hysteresis mechanism interposed between the first and second flywheels. The rotation is transmitted between both flywheels via the damper mechanism, torque limiting mechanism and hysteresis mechanism. Resilient members are secured to spring seats, which are engaged with both ends of a spring of the damper mechanism, at an inner half portion of the spring seat closer to the axis of the flywheel than an axial line of the spring. Excess compression of the resilient members is prevented.

The patents described above are hereby expressly incorporated by reference in the description of the present invention.

Many different types of flywheels are well known to those skilled in the art and, in some cases, torsional dampening mechanisms are associated with the flywheels. Known damping mechanism used with flywheels of outboard motors are typically attached to the crankshaft of an internal combustion engine at a location which is outboard of the flywheel mechanism itself. It would therefore be beneficial if a compact arrangement of a flywheel and a damping mechanism could be provided in which the damping mechanism is completely enclosed within the structure of the flywheel.

SUMMARY OF THE INVENTION

A marine propulsion system made in accordance with the preferred embodiment of the present invention comprises an engine having a crankshaft supported for rotation about a vertical axis and a flywheel attached to the crankshaft for rotation about the vertical axis. It also comprises a torsional damper attached to the flywheel between the flywheel and the engine block.

In a particularly preferred embodiment of the present invention, the flywheel comprises an attachment portion, a plate portion that extends in a radial direction from the attachment component, and a skirt portion attached to the plate portion and extending in a direction which is generally perpendicular to the plate portion. The torsional damper is disposed radially inward from the skirt portion and between the plate portion and the engine.

The plate portion of the flywheel is generally circular and the attachment portion is shaped to receive an end of the crankshaft. The skirt portion is generally cylindrical and the torsional damper comprises an inner member, an outer member, and an elastomeric central member attached between the inner and outer members. The inner member, in a particularly preferred embodiment, is made of aluminum and the outer member is made of cast iron. The flywheel is made of cast iron and the torsional damper is attached to the plate portion. The flywheel is attached to an upper end of the crankshaft when the engine is in operation but it can alternatively be attached to a lower end.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
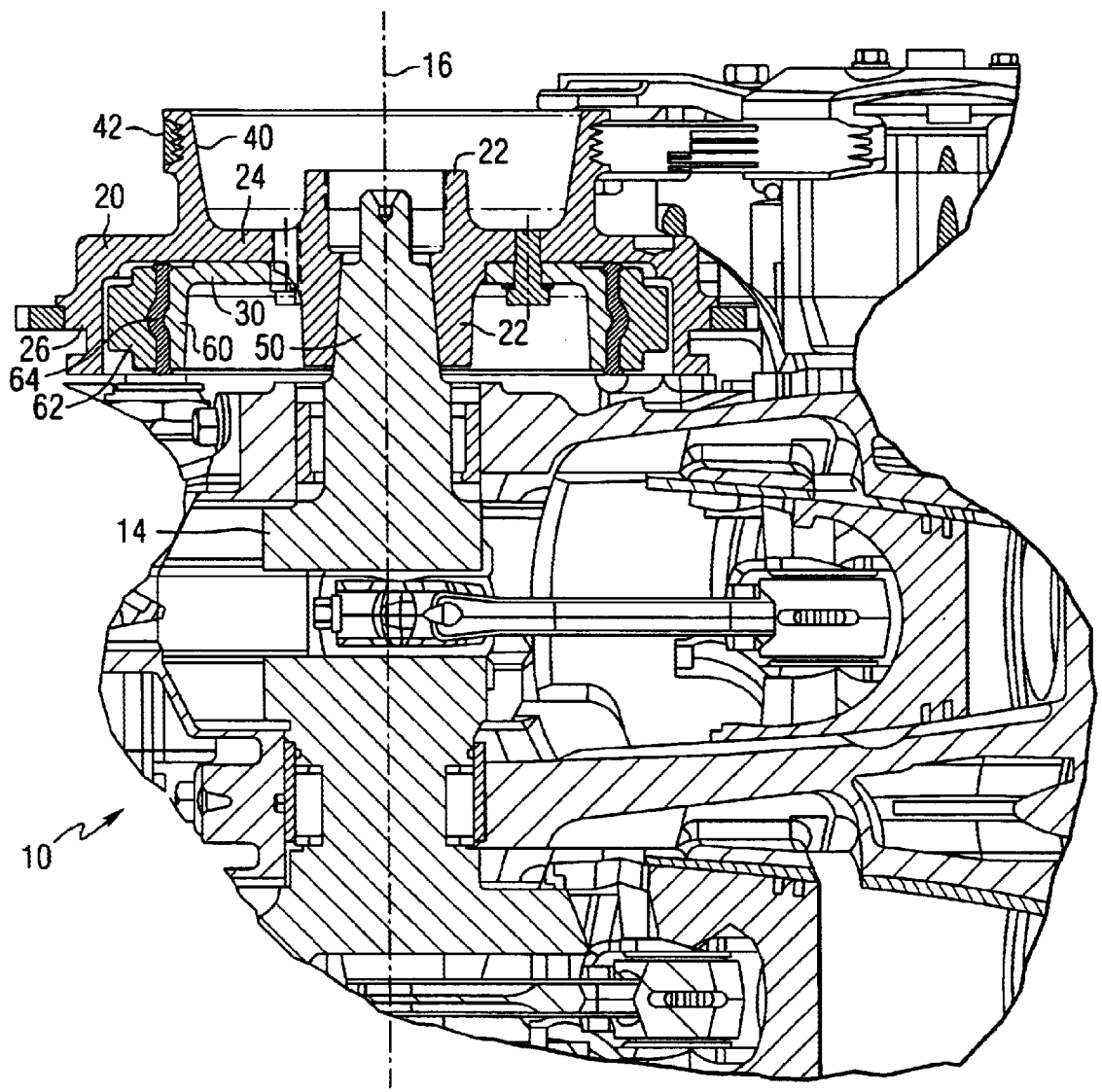
FIG. 1 is a partial sectional view of an internal combustion engine incorporating the present invention.

Throughout the description of the preferred embodiment of the present invention, like components will be identified by like reference numerals.

FIG. 1 is a partial section view of an engine 10 which has a crankshaft 14 which is supported for rotation about a vertical axis 16 by appropriate bearings within the engine 10. A flywheel 20 is attached to the crankshaft 14 for rotation about the vertical axis 16. The flywheel comprises an attachment portion 22, a plate portion 24, and a skirt portion 26. The plate portion 24 extends in a radially outward direction from the attachment component 22 and the skirt portion 26 is attached to the plate portion 24 and extends in a direction which is generally perpendicular to the plate portion 24.

With continued reference to FIG. 1, a torsional damper 30 is attached to the flywheel 20. The torsional damper 30 is attached to the flywheel 20 and disposed between the flywheel 20 and the engine 10, as illustrated in FIG. 1. In a particularly preferred embodiment of the present invention, the torsional damper 30 is disposed radially inward from the skirt portion 26 and between the plate portion 24 and the engine 10.

With continued reference to FIG. 1, it can be seen that the upper portion of the flywheel 20 is shaped to serve the function of a pulley 40 and to receive a belt 42. The attachment portion 22 of the flywheel is shaped to receive an end 50 of the crankshaft 14. In a preferred embodiment of the present invention, the plate portion 24 is generally circular. The skirt portion 26 is generally cylindrical, and the torsion damper comprises an inner member 60, an outer member 62, and a resilient central member 64. The resilient central member, in a preferred embodiment of the present invention is made of an elastomeric material which is disposed between the inner and outer members, 60 and 62.

In a preferred embodiment of the present invention, the inner member 60 is made of aluminum, the outer member 62 is made of cast iron, and the flywheel 20 is made of cast iron. In the embodiment shown in FIG. 1, the torsional damper 30 is attached to the plate portion 24 of the flywheel 20 and the flywheel 20 is attached to an upper end of the crankshaft 14 when the engine is in position for use in an outboard motor.

Figure 2:
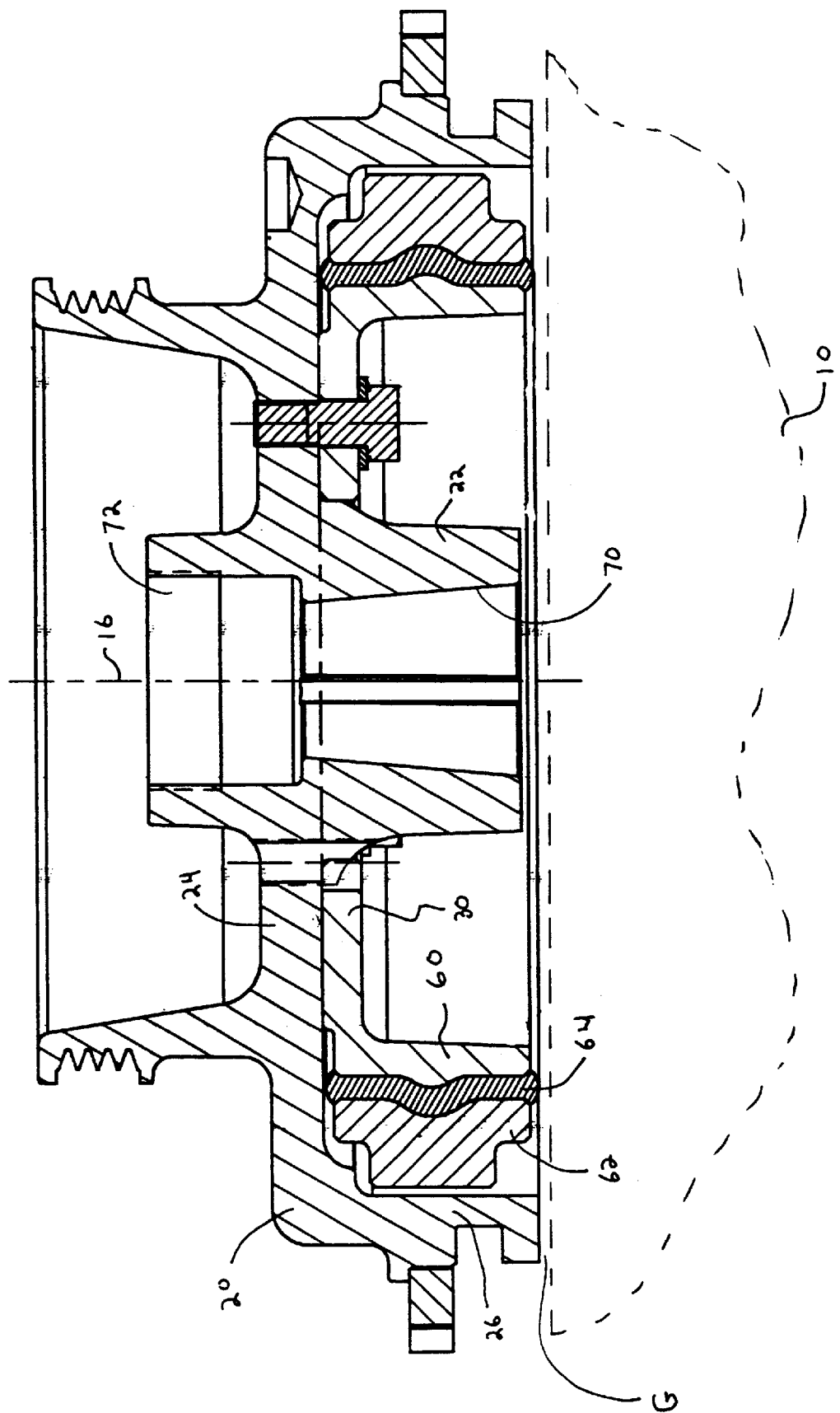
FIG. 2 is a section view of the flywheel and torsional damper of the present invention.

FIG. 2 is a section view of the flywheel 20 and the torsional damper 30. In FIG. 2, the engine 10 is represented by dashed lines to illustrate its position relative to the flywheel 20.

As can be seen in FIG. 2, the flywheel 20 is generally cup-shaped, with a skirt portion 26 attached to a plate portion 24. The attachment portion 22 is shaped to receive the upper end of a crankshaft 14, as described above in conjunction with FIG. 1. As can be seen in FIG. 2, the flywheel 20 rotates about the vertical axis 16 and in close proximity to the engine 10. A relatively small gap G exists between the lower surface of the skirt portion 26 of the flywheel 20 and the upper surface of the engine 10. In a preferred embodiment of the present invention, the torsional damper 30 is also contained within the space defined by the skirt portion 26. In other words, the torsional damper 30 is disposed radially inward from the skirt portion 26 and below the plate portion 24 to be effectively contained between the flywheel 20 and the engine 10.

In FIG. 2, a frusto-conical cavity 70 is shaped to received the upper end 50 the crankshaft 14, as described above in conjunction with FIG. 1. The generally cylindrical cavity 72 is shaped to receive a threaded member, such as a nut, which is attached to an upper threaded portion of the flywheel 14.

Figure 3:
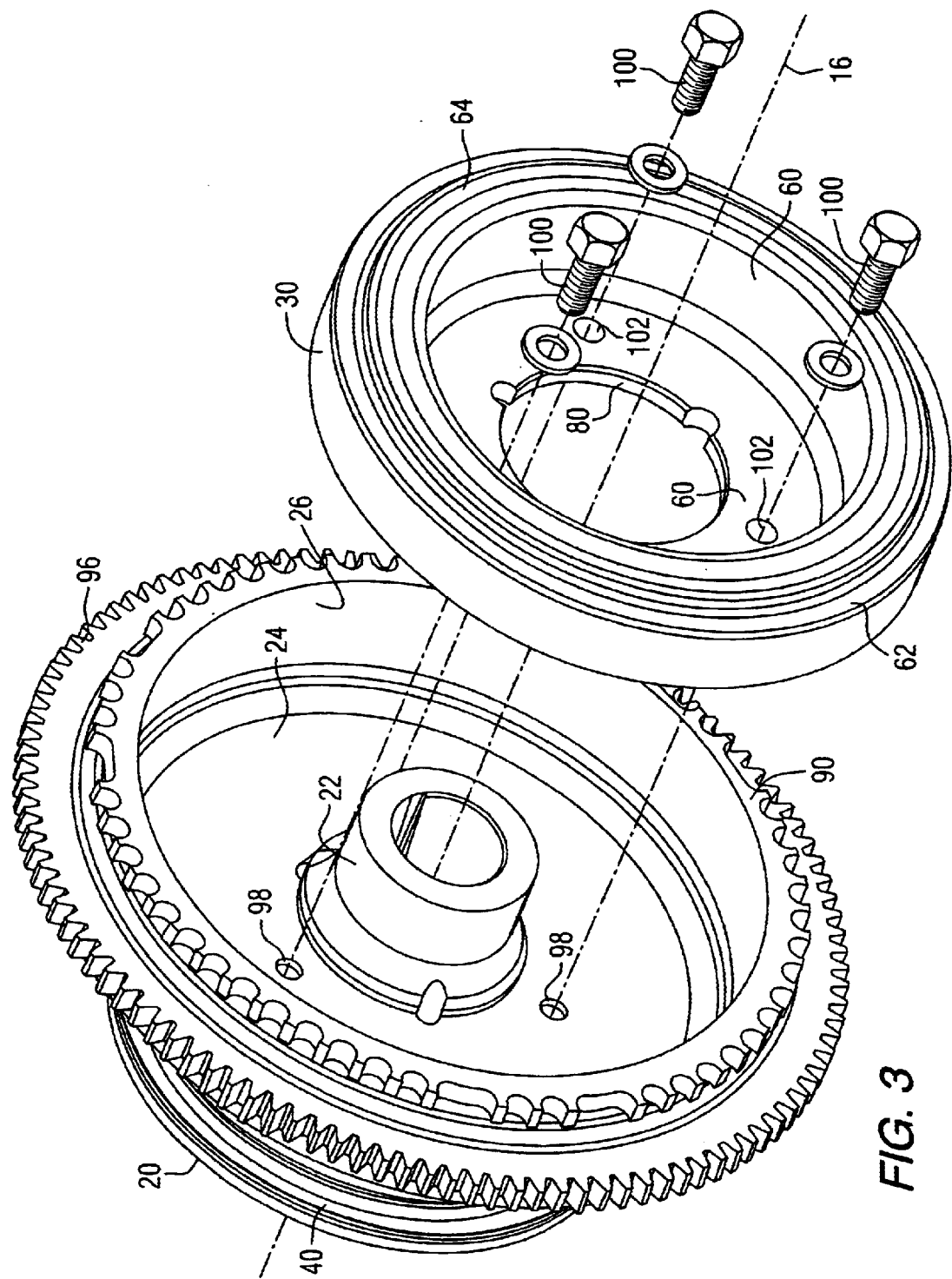
FIG. 3 is an exploded isometric view of the flywheel and torsional damper of the present invention.

FIG. 3 is an isometric exploded view of the flywheel 20 and the torsional damper 30. The plate portion 24 and the skirt portion 26 combine to form a cup-shaped enclosure into which the torsional damper 30 can be disposed. The attachment portion 22 is received through a central opening 80 formed through the inner member 60.

With continued reference to FIG. 3, a set of timing gear teeth 90 are formed on an outer periphery of a surface of the flywheel 20 and positioned to be sensed by a gear tooth sensor. Another set of gear teeth 96 are formed on the flywheel 20 and positioned for engagement with an accessory device, such as a starter motor pinion. Three threaded holes 98 are formed in the plate portion 24 of the flywheel 20 to receive three bolts 100 that extend through holes 102 formed in the inner member 60 of the torsional damper 30.

The vertical axis 16 is shown in FIG. 3 to provide a perspective position of the flywheel 20 and torsional damper 30 when those components are attached together and attached to the crankshaft 14. With reference to FIGS. 1–3, it can be seen that the present invention provides a torsional damper 30 that can be disposed within a cavity of the flywheel 20 defined by the plate portion 24 and the skirt portion 26. When the flywheel 20 is assembled to the crankshaft 14 of the engine 10, the torsional damper 30 is disposed between the flywheel 20 and the engine 10. As is well known to those skilled in the art, the natural frequency of a torsional damper can be described by:

$$f_n = (K/M)^{1/2} \quad (1)$$

in which K is the torsional spring rate of the elastomeric member 64 and M is the rotational inertia of the outer member 62. Although one preferred embodiment of the present invention is designed to damp vibrations of 470 Hz at an engine speed of 4700 RPM, it should be understood that the particular configuration of the torsional damper 57 and the specific frequency for which it is designed is not limiting to the present invention. Instead, the present invention is more directly related to the location of the torsional damper 57 with respect to the flywheel 20 and the internal combustion engine 10.

Although the present invention has been described with particular specificity and illustrated to show a preferred embodiment, it should be understood that alternative embodiments are also within its scope.

We claim:

1. A marine propulsion system, comprising:
   an engine having a crankshaft supported for rotation about a vertical axis;
   a flywheel attached to said crankshaft for rotation about said vertical axis;
   a torsional damper attached to said flywheel between said flywheel and said engine, said flywheel comprising an attachment portion, a plate portion that extends in a radial direction from said attachment portion, and a skirt portion attached to said plate portion and extending in a direction which is generally perpendicular to said plate portion, said torsional damper being disposed radially inward from said skirt portion and between said plate portion and said engine, said torsional damper comprising an inner member, an outer member, and an elastomeric central member attached between said inner and outer members.

2. The marine propulsion system of claim 1, wherein:
   said plate portion is generally circular and said attachment portion is shaped to receive an end of said crankshaft.

3. The marine propulsion system of claim 1, wherein:
   said skirt portion is generally cylindrical.

4. The marine propulsion system of claim 1, wherein:
   said inner member is made of aluminum.

5. The marine propulsion system of claim 1, wherein:
   said outer member is made of cast iron.

6. The marine propulsion system of claim 1, wherein:
   said flywheel is made of cast iron.

7. The marine propulsion system of claim 1, wherein:
   said torsional damper is attached to said plate portion.

8. The marine propulsion system of claim 1, wherein:
   said flywheel is attached to an upper end of said crankshaft when said engine is in operation.

9. A marine propulsion system, comprising:
   an engine having a crankshaft supported for rotation about a vertical axis;
   a flywheel attached to said crankshaft for rotation about said vertical axis, said flywheel comprising an attachment portion which is shaped to receive an end of said crankshaft, a plate portion that extends in a radial direction from said attachment portion, and a skirt portion attached to said plate portion and extending in a direction which is generally perpendicular to said plate portion;
   a torsional damper attached to said flywheel, said torsional damper being disposed radially inward from said skirt portion and between said plate portion and said engine, said plate portion being generally circular and said skirt portion is generally cylindrical, said torsional damper comprising an inner member, an outer member, and an elastomeric central member attached between said inner and outer members.

10. The marine propulsion system of claim 9, wherein:
    said torsional damper is attached to said plate portion.

11. The marine propulsion system of claim 10, wherein:
    said flywheel is attached to an upper end of said crankshaft when said engine is in operation.

12. An outboard motor, comprising:
    an engine having a crankshaft supported for rotation about a vertical axis;
    a flywheel attached to said crankshaft for rotation about said vertical axis, said flywheel comprising an attachment portion which is shaped to receive an end of said crankshaft, a plate portion that extends in a radial direction from said attachment portion, and a skirt portion attached to said plate portion and extending in a direction which is generally perpendicular to said plate portion;

a torsional damper attached to said flywheel, said torsional damper being disposed radially inward from said skirt portion and between said plate portion and said engine said plate portion being generally circular and said skirt portion is generally cylindrical said torsional damper comprising an inner member an outer member, and an elastomeric central member attached between said inner and outer members.

13. The marine propulsion system of claim 12, wherein:

said torsional damper is attached to said plate portion.

14. The marine propulsion system of claim 13, wherein:

said flywheel is attached to an upper end of said crankshaft when said engine is in operation.

* * * * *